United States Patent [19]

Wade

[11] 4,061,425
[45] Dec. 6, 1977

[54] HIGH RESOLUTION ALIGNMENT INTERFEROMETER

[75] Inventor: Jackie F. Wade, Littleton, Colo.

[73] Assignee: Martin Marietta Corporation, Rockville, Md.

[21] Appl. No.: 702,443

[22] Filed: July 6, 1976

[51] Int. Cl.² ............................................. G01B 9/02
[52] U.S. Cl. ................................................. 356/110
[58] Field of Search ........................... 356/110, 106 R

[56] References Cited

U.S. PATENT DOCUMENTS

| | | | |
|---|---|---|---|
| 2,880,644 | 4/1959 | Brockway et al. | 356/110 |
| 3,031,914 | 5/1962 | Saunders | 356/110 |
| 3,285,124 | 11/1966 | Lovins | 356/110 |
| 3,419,898 | 12/1968 | Baldwin et al. | 356/110 |

Primary Examiner—Conrad J. Clark

[57] ABSTRACT

In an interferometer a beam-splitter reflector such as a compound prism is provided having an interface and a base normal thereto. An entrance face and exit face are aligned with respect to the interface to provide a zero order interface fringe along an axis of one face when a reflecting surface such as an autocollimating mirror is parallel to the base. Also, the zero order interference fringe is fixed at the apex of the prism and rotates as a function of angular misalignment of the reflecting surface with respect to a plane parallel to the prism base. Position of the fringe is measured to provide a high resolution indicaton of angular misalignment of the reflecting surface.

10 Claims, 10 Drawing Figures

HIGH RESOLUTION ALIGNMENT INTERFEROMETER

BACKGROUND OF THE INVENTION

This invention relates to alignment interferometers for measuring very small angular displacements.

Known forms of alignment interferometers, also known as autocollimators, utilize beam splitter-reflectors to produce interference fringes. An example of a beam splitter-reflector is a Koester prism which is a compound prism consisting of two identical 30°-60°-90° prisms joined at their longer legs to form a beam-splitting interface. The shorter legs form a planar base with the interface at the center thereof. The hypotenuses of the two component prisms form an entrance face and an exit face. When a collimated light source is directed at the entrance face and a reflecting mirror in a reference plane is parallel to the base, which is the same as normal to the interface, zero order interference fringes are seen at the exit face. This phenomenon is due to cancellation at the prism interface of beams which emanated from the source, were split into two rays at the interface, traveled along exactly equal optical path lengths and were recombined at the interface. When the mirror surface is not in the reference plane, the rays of a split beam do not travel exactly equal optical path lengths, and appearance of zero order interference fringes is affected. In the following description, the terms angular displacement or misalignment denote angular displacement or misalignment with respect to the reference plane. Various uses of this phenomenon have been made to provide interferometers which measure the angular displacement of a reflecting surface with respect to the reference plane. For example, U.S. Pat. No. 3,285,124, issued to Lovins, Nov. 15, 1966 discloses a beam-splitting prism modified by the addition of a tapered layer at the interface such that a zero order interference fringe translates along the interface with angular displacement of the reflecting surface. U.S. Pat. No. 2,880,644 to Brockway et al. issued Apr. 7, 1959 uses such a compound prism with one component prism rotated with respect to the other (very slightly) about an axis normal to the interface and prism apex. A plurality of interference fringes are seen when the mirror is aligned. Additional interference fringes rotated with respect to the original fringes are produced in response to misalignment. The observer must analyze the appearance of a number of fringes. These and other known prior systems have been limited to 0.01 arc-second of resolution of angular misalignment.

It is also necessary to provide a practical design for a beam splitter-reflector in an interferometer. Since in high resolution applications beam splitter-reflectors must be manufactured within exceedingly small tolerances (e.g. a fraction of an arc second), they cannot simply be machined according to blue prints. Generally they are ground or otherwise processed on an optical bench until there is an empirical indication (e.g. appearance of interference fringes) that the desired dimensions have been obtained. What on paper may appear to be simple modifications to a Koester prism may be extrememly difficult to manufacture.

SUMMARY OF THE INVENTION

It is therefore an object of the present invention to provide an autocollimator-interferometer having at least 0.001 arc-second of resolution utilizing currently available components.

It is also an object of the present invention to provide an interferometer in which a rotating zero order interference fringe fixed at a beam splitter-reflector apex is produced which rotates with respect to angular misalignment of an autocollimating reflecting surface.

It is another object of the present invention to provide an interferometer of the type described in which one zero order interference fringe of selectable width is produced.

It is also an object of the present invention to provide an interferometer of the type described utilizing a beam splitter-reflector requiring simplified modification with respect to a Koester prism, whereby difficulty of manufacture is reduced.

Briefly stated, in accordance with the present invention there is provided an alignment interferometer including a beam splitter-reflector having an entrance face, an exit face and a base and having one face effectively rotated with respect to a corresponding face on a Koester prism about a line on the prism face normal to the prism apex. When collimated light is directed at the entrance face, a zero order interference fringe is seen at the exit face and rotates about a point on the apex of the system with respect to angular misalignment of an autocollimating reflecting surface. Position of the interference fringe is measured with respect to a reference line to determine angular misalignment of the reflecting surfaces.

BRIEF DESCRIPTION OF THE DRAWINGS

The means by which the foregoing objects and features of invention are achieved are pointed out with particularity in the claims forming the concluding portion of the specification. The invention, both to its organization and manner of operation may be further understood by reference to the following description taken in connection with the following drawings.

Of the drawings.

DESCRIPTION OF THE PREFERRED EMBODIMENT

Figure 1:
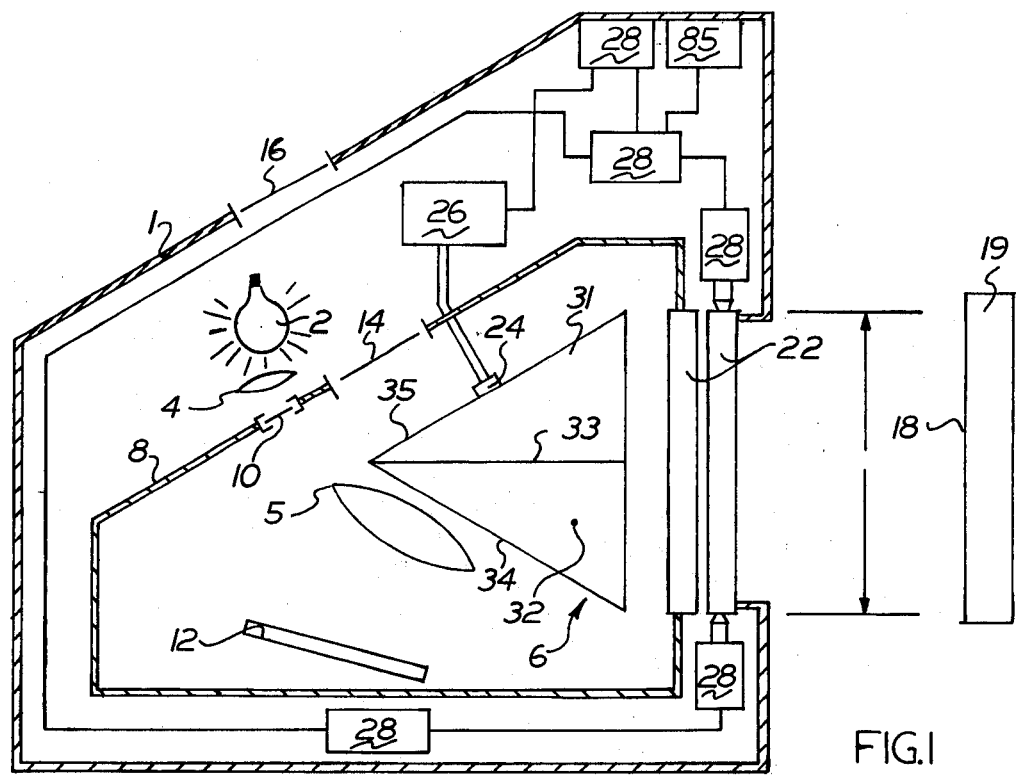
FIG. 1 is a mechanical schematic and electrical block diagramatic representation of a system constructed in accordance with the present invention.

Referring to FIG. 1, there is illustrated a system constructed in accordance with the present invention including a interferometric, autocollimating system. Included in a cabinet 1 are a light source 2, collimating lenses 4 and 5 and a beam splitter-reflector 6, for example, a compound prism comprising a modified Koester prism. The lens 5 and 6 may be included in a constant temperature chamber 8 if it is desired to prevent imprecision due to the thermal coefficient of expansion of any components. Light is directed from the source 2 to the lens 4 through an aperture 10 in the chamber 8 toward a mirror 12 which reflects light through the collimating lens 5. Viewing windows 14 and 16 may be provided in the chamber 8 and cabinet 1 respectively. The system reflects light at an autocollimating reflecting surface 18 supported on mounting means 19. Optical path length adjusting means 22 maybe provided interposed between the reflecting surface 18 and the prism 6. As described below, zero order interference fringes are produced which are sensed by a detector unit 24. In one form of the invention, the detector unit 24 is coupled to detector circuitry 26 to control servosystem means 28.

Figure 2:
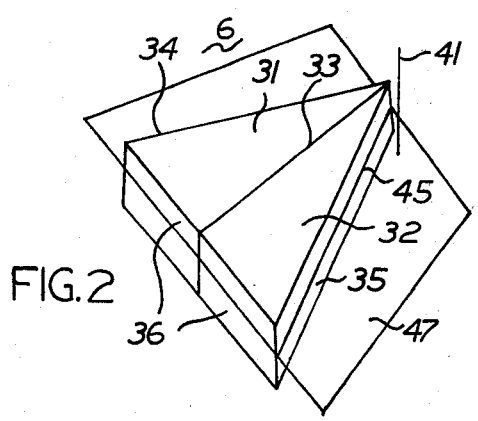
FIG. 2 is an axonometric view of a prism utilized in a preferred form of the present invention.

The structure of the beam splitter-reflector 6, which may also be referred to as the prism 6 is described further with respect to FIGS. 1 and 2. The prism 6 may comprise a compound prism consisting of first and second 30°-60°-90° triangular prisms 31 and 32 wrung together along their longer bases to provide a modified form of a Koester prism having a beam spliting interface 33, an entrance face 34 and exit face 35 and a base 36. The hypotenuse of the prism 31 comprises the entrance face 34, and the hypotenuse of the prism 32 comprises the exit face 35 of the prism 6. The base 36 is a planar surface normal to the beam-splitting interface 33 consisting of shorter legs of the prisms 31 and 32. While the use of a beam splitter-reflector comprising a compound prism is preferred, it should be realized, however, that the faces 34 and 35 could be replaced by optically flat plates and the interface 33 replaced by a beam-splitting plate with air as the medium between plates. In an unmodified Koester prism, a beam entering the entrance face 34 and being split at the interface 33 forms two rays, each reflected from the internal surfaces of the faces 34 and 35. The two rays travel equal path lengths to the reflective surface parallel to the base 36, and the two rays interfere when recombined, providing interference fringes across the entire exit face 36. It is desired to provide a beam splitter-reflector 6 having means for providing one zero order interference fringe which is fixed at the prism apex and rotates with respect to angular misalignment of a relecting surface (such as the reflecting surface 18 of FIG. 1). Such a beam splitter-reflector may, for example, be defined by a beam splitter-reflector obtained by in effect, rotating one face of a Koester prism, for example, the exit face, about an axis which is normal to the apex of the prism and lies in the plane of the exit face. (It is noted that if the face were effectively rotated about an axis which lies in the plane of the face but is parallel to the apex, then a fringe which translates as a function of angular misalignment would be produced). An apex 41 of the beam splitter-reflector 6 is drawn for purposes of illustration. The apex 41 is a line in the plane of the interface 33 at the intersection of the faces 34 and 35, and as mathematically defined, is infinitely thin. Therefore, as a practical matter in construction prisms 6 are generally truncated adjacent the apex 41. However, whether or not the apex 41 is physically provided, as a functional matter it is a physical reference point which is utilized.

Figure 3:
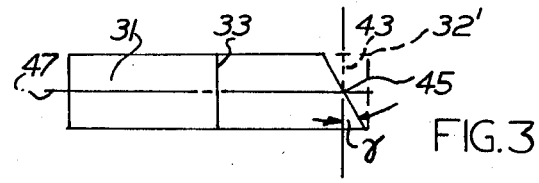
FIG. 3 is an elevation of FIG. 2 looking along a "hypotenuse" of the prism.
Figure 4:
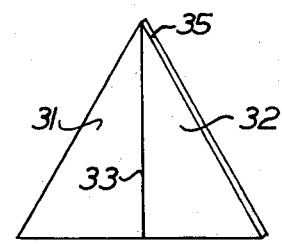
FIG. 4 is a plan view of the prism of FIG. 3.

Implementation of the beam splitter-reflector 6 is illustrated with respect to FIG. 3, which is an elevation of the prism 6 looking along the exit face 35 (which is also the hypotenuse of the prism 32) and FIG. 4, which is a plan view, as well as FIG. 2. The dotted line 43 indicates the projection of a face 43 of a pure Koester prism. The face 35 of the completed prism 6 intersects the line 43 at a reference line 45 (seen as point 45 in FIG. 3) and is at angle $\gamma$ thereto. In fabrication, this construction is achieved by providing a 30°-60°-90° prism 32' which is slightly larger than the prism 31 and lapping or otherwise processing the hypotenuse of the prism 32' until the prism 32 is provided having the face 35 skewed at an angle $\gamma$ with respect to the apex 41. In a horizontal cross section taken in a plane 47 intersecting the line 45, the projections of the prisms 31 and 32 are congruent. Thus in one horizontal plane of the prism 6, equal optical path lengths are provided. It should be noted that a conventional 30°-60°-90° prism 32 could be provided and the prism 31 could be so modified in the alternative.

It is noted that all departures from the exact dimensional relationships in a Koester prism are grossly exaggerated for purposes of illustration. In typical embodiment, the angle $\gamma$ will be a small fraction of one arc-second. One zero order interference fringe is thus provided when the reflecting surface 18 is parallel to the base 36 since exactly equal optical path lengths are provided in one horizontal plane of the prism 6. (The horizontal plane is vertically disposed when viewed in FIG. 1.) The width of the fringe (width being in a direction normal to the reference line 45) obtained varies with the magnitude of the angle $\gamma$. Providing a fringe of increased width facilitates sensing the position of the fringe.

Figure 5:
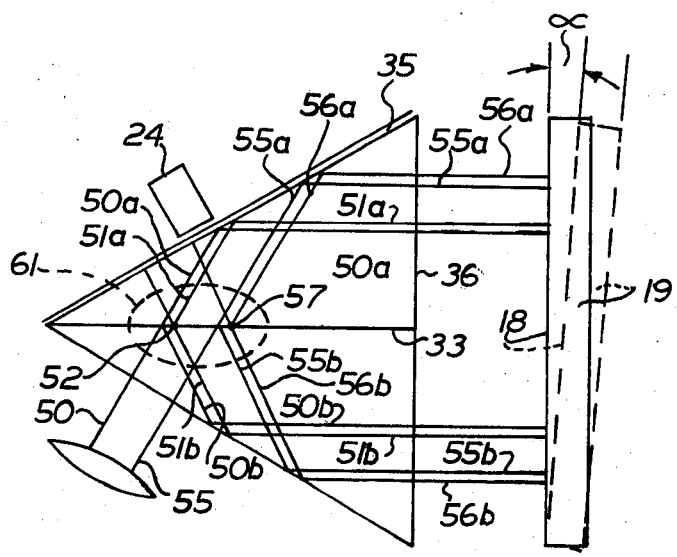
FIG. 5 is an optical wave diagram illustrating operation of the present invention.
Figure 6:
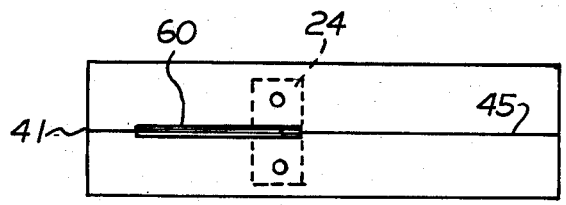
FIG. 6 is a view of the exit face of the prism of FIG. 2 when the reflecting surface is alligned with the prism.
Figure 7:
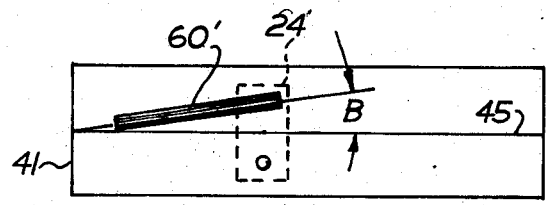
FIG. 7 illustrates a rotated zero order fringe produced in response to angular misalignment of the reflecting surface.

Operation is illustrated with respect to FIGS. 5-7. The reflecting surface 18 is aligned with the base 36, i.e. disposed in a plane parallel thereto. Collimated light from the lens 5 is directed at the entrance face 34. One light beam 50 is directed at the interface 33; the transmitted portion is referred to as ray 50a. The beam 50 is also reflected, and this portion of the beam 50 is referred to as ray 50b. The rays 50b and 50a are internally reflected by the inner surfaces of the faces 34 and 35 respectively and projected in a direction normal to the base 36. Reflected rays 51a and 51b result, which are reflected back normal to the base 36 since the reflecting surface 18 is paralled to the base 36. The reflected rays 51a and 51b are shown laterally displaced from the rays 50a and 50b for facility of illustration. The rays 51a and 51b are internally reflected by the inner surfaces of the faces 35 and 34 and are combined at the interface 33. Resulting rays are partly reflected toward the face 34 and partly toward the face 35. Where the rays 51a and 51b have travelled the same distance, the light waves are out of phase, and a zero order interference fringe results. The rays 51a and 51b recombine at point 52 on the interface 33 in FIG. 5. Similarly, a beam 55 eminates from the lens 5 laterally displaced from the beam 50 is similarly divided into rays 55a and 55b at the interface 33. The rays 55a and 55b are similarly reflected by the reflective surface 18 as rays 56a and 56b respectively. They recombined at the interface 33 at point 57 in FIG. 5 and where path lengths are equal interference results. Thus as viewed in FIG. 5, there is an interference fringe which may be labeled line 52-57. However, again referring to FIG. 3, due to the construction of the beam splitter-reflector 6, path lengths of the rays 56a and 56b and path lengths of the rays 51a and 51b will only be equal in the plane 47 (FIG. 3). Therefore, the resulting interference fringe will be a horizontal line 60 when viewing an elevation of the exit face 35. This is illustrated in FIG. 6.

However, let it be assumed that the reflecting surface 18 is rotated about an axis both normal to the base 36 and interface 33 by an angle $\alpha$. Then, as viewed in FIG. 5, the upper end of the reflecting surface is farther away from the base 36 than the lower end. Therefore, the rays 50a and 51a and the rays 55a and 56a travel a longer distance than the respective rays 50b and 51b as well as the rays 55b and 56b. Therefore, interference will not occur in the plane 47 (FIG. 3) since the ray optical path lengths will not be equal. Since the path length is longer in air for the rays 50a, 51a, 55a, and 56a interference will occur in a line along which optical path lengths are shorter in the prism 6. Since the path length difference in the prism decreases as the apex 41 is neared, the resulting interference fringe will be seen along an equal path distance line 60' illustrated in FIG. 7 at an angle $\beta$ to the horizontal rotated with respect to the reference line 45 about an axis fixed at the apex 41. There is a great amplification in the relationship of $\beta$ to $\alpha$, nominally 3000:1.

The length of the interference fringe corresponds to a recombination portion 61 (FIG. 5) of the interface 33. The length of the recombination portion 61 is determined by the size i.e. light gathering capability, of the prism 6 and particularly by the width of the base 36. The recombination portion is a constant proportion of the prism, and runs approximately ⅓ of the way from the apex 41 toward the base 36. In order to get the maximum "leverage" i.e. sense the maximum vertical component of fringe movement, the detector unit 24 is positioned adjacent to the end of the recombination portion 61 remote from the apex 41 and faces the exit face 35. The projection of the position of the detector unit 24 is shown in dotted lines in FIGS. 6 and 7.

Figures 8, 9:
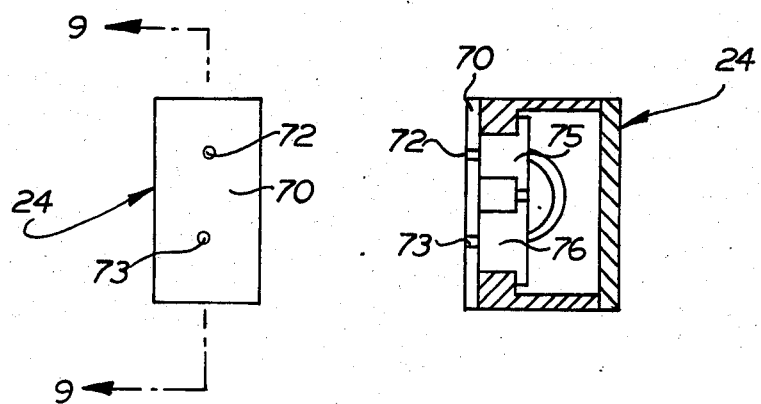
FIG. 8 is an illustration of a detector mask.
FIG. 9 is a cross-sectional view taken along lines 9—9 of FIG. 8 of one form of optical detector unit for sensing position of the zero order fringe.

The detector unit 24 includes a mask 70 seen in FIG. 8 which is provided having holes 72 and 73 aligned to be equidistantly displaced from the reference line 45. FIG. 9 is a cross sectional view taken along lines 9—9 of FIG. 8 and showing photodetectors 75 and 76 respectively aligned behind the holes 72 and 73. The most sensitive portions of the photo detectors 75 and 76 in registration with the holes 72 and 73. The detectors 75 and 76 are positioned such that when $\beta$ is greater than zero, illumination on the detectors 75 and 76 is uneven. This represents an angular misalignment $\alpha$ of the reflecting surface 18. In order to measure this misalignment, the optical path length adjusting means 22 (FIG. 1) may comprise wedges utilized to equalize the path lengths of reflected rays until $\beta$ is made equal to zero. The optical path length adjustment means 22 thus compensates for inequalities of optical path lengths in the plane 47 (FIG. 3). By measuring the movement of the wedge comprising the path length adjustment means 22, the angular displacement $\alpha$ is known. Alternatively, the support means 19 and the reflecting surface 18 may comprise an articulating mirror which may be moved in small steps to place the reflecting surface 18 parallel to the base 36 to determine angular displacement, rather than using the optical path length adjustment means 22.

Figure 10:
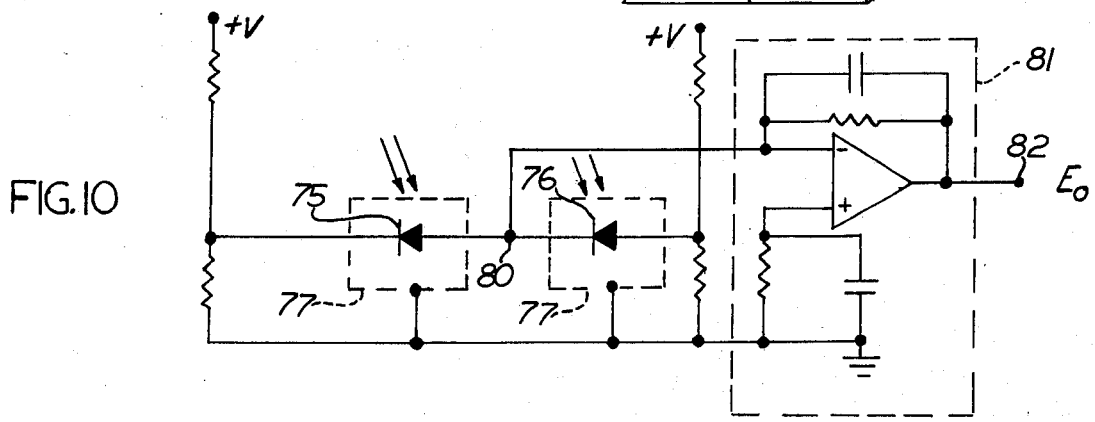
FIG. 10 is a schematic diagram of control circuitry utilized in one preferred form of the present invention.

Means for automating this operation are shown in FIGS. 1 and 10. In FIG. 10, which is a schematic illustration of one form of detector circuit 26, the detectors 75 and 76 are represented as light sensitive diodes connected in series. A source of potential plus V is connected to the cathode of the detector 75, and a source of potential minus V is connected to the anode of the detector 76. To minimize the effect of stray reactance, each detector 75 and 76 is shown in a grounded case 77. When the illumination of the two detectors is equal, the potential difference at a terminal 80 intermediate the anode of the detector 75 and cathode of the detector 76 is zero. This terminal is connected to detecting means, in the present embodiment integrating differential amplifier 81, to provide an error output voltage Eo at an output terminal 82. The error voltage at the terminal 82 is connected to the servosystem means 28 for closed loop control to null the angle $\beta$ in a well known manner. The servosystem control 28 may operate the optical path length adjust means 22 or the articulating mirror means 19. Conventional measuring means in the servosystem control circuitry 28 measure the movement necessary to null the angle $\beta$ and are preferably normalized to give a direct output reading of the angular misalignment $\alpha$ at a conventional readout means 85.

In laboratory tests 0.001 arc-seconds of resolution has been obtained. Noise levels of 0.000035 arc-seconds of angular displacements have been recorded, and threshold sensitivities of 0.0001 arc-seconds have been achieved, thus indicating extremely high resolution performance.

It should be noted that means for responding to the position of the position of the zero order interference fringe may simply comprise means for an observer to view the zero order interference fringe. Many other forms of electrical instrumentation than those shown in FIGS. 1 and 10 will readily suggest themselves to those skilled in the art. What is thus provided is an interferometer-autocollimator using a beam splitter-reflector providing equal optical path lengths in a plane having a projection as a reference line on one face of the beam splitter-reflector, and in which a zero order interference fringe fixed at an apex of the beam splitter-reflector rotates with respect to angular misalignment of a reflecting surface with respect to a reference plane.

What is claimed is new and desired to be secured by Letters Patent of the United States is:

1. An autocollimator comprising a light source, a beam splitter-reflector having means for producing a zero order interference fringe fixed at an apex of said beam splitter-reflector and rotating about an axis at said apex with respect to angular misalignment of an autocollimating mirror with respect to a base of said beam splitter-reflector, and means for sensing the position of said zero order interference fringe.

2. An optical apparatus for detecting very small angular misalignment of a reflective surface with respect to a reference plane, said apparatus comprising a beam splitter-reflector having a light-receiving entrance face, an exit face, from which light is transmitted and a base parallel to said reference plane and spaced in facing relation to the reflective surface, said beam splitter-reflector further having a beam splitting interface, a collimated light source directed to said interface, said beam splitter-reflector having means for producing a zero order interference fringe fixed at an apex of said beam splitter-reflector and lying along a reference line and which rotates about an axis at said apex in response to misalignment of said reflective surface from said reference plane, and means for responding to the position of said zero order fringe whereby misalignment of said reflective surface from said reference plane may be detected.

3. Optical apparatus according to claim 2 wherein said beam splitter-reflector consists of a compound prism.

4. Apparatus according to claim 2 wherein said means for responding comprises detector means having first and second photosensors disposed on opposite sides of said reference line and adjacent said exit face for producing an output indicative of the position of said zero order interference fringe as viewed on said exit face.

5. Apparatus according to claim 4 further comprising optical path length adjustment means for compensating for unequal optical path lengths of rays in a plane including said reference line due to misalignment of said reflecting surface with respect to said base, means for moving said optical path length adjustment means to cause said zero order fringe to coincide with said reference line, and means for measuring the movement of said optical path length adjustment means, whereby a measurement of the angular misalignment of said reflective surface with respect to said base is provided.

6. Apparatus according to claim 5 further including servosystem control means electrically coupled to said detector means and mechanically coupled to said optical path length adjustment means for nulling the error of the rotation of said interference fringe from the reference line.

7. Apparatus according to claim 6 wherein said optical path length adjustment means comprises an optical wedge disposed between said reflecting surface and said base.

8. Apparatus according to claim 6 wherein said optical path length adjustment means comprises an articulating mirror including said reflecting surface.

9. Optical apparatus according to claim 2 wherein said means for producing said zero order interference fringe which rotates about an axis at said apex includes surface portions of said exit face skewed at an angle with respect to said apex, and wherein the width of said zero order interference fringe is a function of said angle.

10. An interferometer comprising a beam splitter-reflector having first and second planes and a beam-splitting plane disposed intermediate thereto, said first and second planes being arranged to reflect parallel rays in response to a light source aimed at said first plane toward said beam-splitting interface, a reflective surface disposed substantially normal to said beam-splitting interface, one of said planes being rotated about a line extending therethrough and normal to an apex defined by the intersection of said first and second planes, whereby a zero order fringe interference is provided fixed at the apex of said beam splitter-reflector and rotating about an axis at said apex as of function of angular displacement of said reflective surface with respect to the plane normal to said beam-splitting plane, and means for measuring the position of a zero order fringe viewed at said second plane whereby angular misalignment of said reflecting surface with respect to the plane normal to said interface is determined.

* * * * *